US007391957B2

(12) United States Patent
Behl

(10) Patent No.: US 7,391,957 B2
(45) Date of Patent: *Jun. 24, 2008

(54) TELEVISION RECORDER HAVING A REMOVABLE HARD DISK DRIVE

(75) Inventor: Sunny Behl, San Jose, CA (US)

(73) Assignee: Steinbeck Cannery LLC, Los Altos, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 11/157,248

(22) Filed: Jun. 20, 2005

(65) Prior Publication Data

US 2005/0240979 A1  Oct. 27, 2005

Related U.S. Application Data

(63) Continuation of application No. 09/610,053, filed on Jul. 5, 2000, now Pat. No. 6,925,246.

(51) Int. Cl.
*H04N 5/00* (2006.01)
*H04N 7/00* (2006.01)
(52) U.S. Cl. .......................................... 386/46; 386/125
(58) Field of Classification Search .................... 386/46, 386/124, 125, 126, 45, 105, 106
See application file for complete search history.

(56) References Cited

U.S. PATENT DOCUMENTS

| 4,896,777 | A | 1/1990 | Lewis |
| 4,941,841 | A | 7/1990 | Darden et al. |
| 5,434,678 | A | 7/1995 | Abecassis |
| 5,463,527 | A | 10/1995 | Hager et al. |
| 5,469,311 | A | 11/1995 | Nishida et al. |
| 5,541,738 | A | 7/1996 | Mankovitz |
| 5,797,667 | A | 8/1998 | Wu |
| 5,977,964 | A | 11/1999 | Williams et al. |
| 5,982,363 | A | 11/1999 | Naiff |
| 6,137,679 | A | 10/2000 | Chang |
| 6,473,297 | B1 | 10/2002 | Behl |
| 2001/0035903 | A1 | 11/2001 | Trane |

(Continued)

FOREIGN PATENT DOCUMENTS

DE       29818775 U1    10/1998

(Continued)

OTHER PUBLICATIONS

IBM Technical Disclosure Bulletin, vol. 40, No. 12, Dec. 1997, "Frictionally Constrained Shock Insulator for Direct Access Storage Device", IBM Technical Disclosure Bulletin, Dec. 1997, vol. 40, No. 12.

(Continued)

*Primary Examiner*—Bob Chevalier
(74) *Attorney, Agent, or Firm*—Perkins Coie LLP

(57) ABSTRACT

A television recorder defines a recessed memory storage device bay and a rack mounted in the memory storage device bay. The recorder includes a carrier for removeably locking a hard disk drive into the rack. The television recorder connects with a television and television broadcast source for simultaneously recording television programming and replaying recorded programming. The carrier engages the rack to removeably insert the hard disk drive into the television recorder.

22 Claims, 4 Drawing Sheets

U.S. PATENT DOCUMENTS

2003/0206711 A1    11/2003    Berkheiner et al.

FOREIGN PATENT DOCUMENTS

| EP | 0328260 | 1/1989 |
|---|---|---|
| EP | 0570138 | 4/1993 |
| EP | 0843315 | 5/1998 |
| GB | 2241370 | 8/1991 |
| GB | 2342759 | 4/2000 |
| TW | 281313 | 7/1996 |
| TW | 312356 | 8/1997 |
| WO | WO 93/24932 | 12/1993 |
| WO | WO 96/33579 | 10/1996 |
| WO | WO 97/10682 A1 | 3/1997 |
| WO | WO 99/52279 | 10/1999 |
| WO | WO 00/07368 | 2/2000 |
| WO | WO 00/18108 | 3/2000 |
| WO | WO 00/28736 | 5/2000 |
| WO | WO 02/03768 A2 | 1/2002 |

OTHER PUBLICATIONS

*What is TiVO?* Retrieved Jul. 2, 2000 from the World Wide Web: http://www.tivo.com/what/intro.html.

*What is TiVo? Recorder Specifications.* Retrieved Jul. 5, 2000 from the World Wide Web: http://www.tivo.com/what/how2.html.

ReplayTV, Inc. Retrieved Oct. 5, 2000 from the World Wide Web: http://replaytv.com/overview/techspecs.htm.

Needle, David (Jan. 20, 1999). *Cool products pop up at Showcase 99.* Retrieved Jul. 2, 2000 from the World Wide Web: wysiwyg://31/http://www.cnn.com/TECH/computing/9901/20/cool.idg/index.html.

Pescovitz, David (Apr. 17, 2000). *Gadget: ReplayTV 2000.* Retrieved Jul. 2, 2000 from the World Wide Web: wysiwyg://28/http://www.thestandard.com/article/display/0,1151,14069,00.html.

Berst, Jesse (Nov. 3, 1998). *ReplayTV: VCR Death Sentence?* Retrieved Jul. 5, 2000 from the world Wide Web: http://www.zdnet.com/anchordesk/cgi-bin/print_story.cgi?story=story_2703 Web.

U.S. Appl. No. 60/192,642, filed Mar. 27, 2000, Trane.

U.S. Appl. No. 60/211,577, filed Jun. 15, 2000, Berkheiner.

TELEVISION RECORDER HAVING A REMOVABLE HARD DISK DRIVE

CROSS-REFERENCE TO RELATED APPLICATIONS

This application is a continuation application of U.S. patent application Ser. No. 09/610,053, filed on Jul. 5, 2000 now U.S. Pat. No. 6,925,246, which is herein incorporated by reference in its entirety for all purposes.

INCORPORATION BY REFERENCE:

WIPO publication no. WO 00/07368 published on Feb. 10, 2000, and WIPO publication no. WO 99/52279 published on Oct. 14, 1999, by applicant TiVo, Inc. are incorporated herein by reference.

FIELD OF THE INVENTION

The present invention pertains to media switching, and more particularly to television recorders having high-speed digital recording media.

BACKGROUND OF THE INVENTION

ReplayTV, Inc. and TiVo, Inc. have developed television recorders incorporating media switches. In time, it is expected that these recorders will replace traditional VCR technology. Instead of recording a television input stream directly to a magnetic tape, these television recorders record and convert the television input streams, manipulate the input stream into digital data, convert the digital data stream into a television output stream, and selectively play back the output stream to a television. A hard disk drive is used to record both the input stream and to play back the output stream.

Many advantages that are realized through the use of hard drive media in combination with a television recorder having a media switch. ReplayTV, Inc. outlines some of the advantages on their web site www.replaytv.com:

Watch your favorite TV programming—on your schedule. ReplayTV will forever change the way you watch television. It sets you free from those TV schedules that are never where you left them. It pauses live TV. It records without videotape. It lets you skip over the boring parts. It searches and records shows with the touch of a button. It gives you control over live television. With ReplayTV, you can digitally record up to 30 hours of the shows you want to see and then watch them whenever you want. What doesn't ReplayTV give you? A monthly bill.

Pause Live TV (and perform other cool tricks). Watching your favorite tennis stars in a doubles match? Pause live programming to answer the phone or grab a snack—then resume watching without missing a single forehand crush or masterful lob. Bored with a rain delay? Skip ahead to get to the action. Want a closer look at a crucial line call? Use multispeed forward and reverse to get there, then catch every detail in Slo-Mo and frame advance. (And feel free to disagree with the referee!)

Go wherever you want at warp speed. Want to skip a scene that's too long or just plain boring? Use QuickSkip™ to jump forward to the good stuff. Plus you can digitally fast forward and rewind at 2 to 20 times normal speed. Now that's power. Are you starting to feel omnipotent yet? Read on.

Not sure what you're in the mood for? No problem. ReplayZones let you browse through more than 100 show categories—it's the easiest way to find the best of any television genre. Whether it's Sitcoms, Cartoons, Four Star Movies or Biographies, ReplayTV puts them all at your fingertips.

Know what you want? Find it fast. If you can spell "ER," ReplayTV can find it-instantly. With the Find Shows feature, you type in a show title or for that matter any keyword and, POW! up comes a list of every single show that matches your search. Find Shows even gives you a description of each show it's found so you can decide which ones to record. Tap the Record button and ReplayTV will do the rest.

The first day you own ReplayTV is the last day you watch boring television. Check out the on-screen Channel Guide, a complete listing of everything that's on for the coming week. When you find a show you like, simply press the Record button—it's that easy. Press it twice and ReplayTV will record that show every time it's on.

Live Instant Replay, Slow Motion, and Frame-by-Frame Advance. Okay, so the good guys somehow escaped the jaws of death—but it all happened so quickly, you missed a part. Tap the Instant Replay button and watch the last crucial 7 seconds again. And again. And again. Still puzzled about our heroes' escape? Dissect the scene using the digital Slow Motion or Frame-by-Frame Advance. So that's how they saved the world and fell in love!

Say "so long" to the VCR Programming Blues. Recording with ReplayTV is easy—no, really. Highlight a show, press the red record button once, and the show is recorded once. Press twice, and your show is automatically recorded every week. This means you'll never miss your favorite show again! Not only that ReplayTV digitally records up to 30 hours of programming.

Get Into the Zone

Not sure exactly what you're looking for? Use ReplayZones™ to browse and record programming by category such as sitcoms, talk shows and four-star movies. You can even find new favorites you didn't even know about! With ReplayZones you can always find what's best on TV.

Know what you want? Find it fast. If you can spell "ER", ReplayTV can find it—instantly. The Find Shows menu searches the next seven days of channel guide content using "keywords" you provide. Search for Eastwood . . . murder . . . millionaire . . . or whatever. ReplayTV lists all matching shows, and you select the ones you want to see.

One technical drawback to the systems described above involves the capability of a hard disk drive to record, cache, and replay streamed television signals. Hard disk drives have a mean time between failure that may extend ten years or more. If the drive is used continuously, this mean time may be reduced. Continuous hard drive operation causes heat to accumulate in the drive. Heat may reduce the mean time between failure, cause drive failure, or cause data loss. What is desired is a way of cooling hard disk drives that are used in television recorders.

Another drawback of the systems described above is that there is limited recording capability. ReplayTV, for example, has a thirty-hour limit for recording. Accordingly, television broadcasts, home movies, and other recorded events exceeding thirty hours, can not be stored on the recorder. A standard VCR may be used for archiving purposes. What is desired is a way of increasing the storage capacity of television recorders. What is further desired is a way of archiving stored programming without requiring a standard VCR machine.

SUMMARY OF THE INVENTION

A television recorder defines a recessed memory storage device bay and a rack mounted in the memory storage device bay. The recorder includes a carrier for removeably locking a hard disk drive into the rack. The television recorder connects with a television and television broadcast source for simultaneously recording television programming and replaying recorded programming. The carrier engages the rack to removeably insert the hard disk drive into the television recorder.

According to one aspect of the invention, the carrier includes a face with a fan. The fan draws air from beyond the recorder to within the recorder to cool the hard disk drive.

According to another aspect of the invention, the carrier has lateral sides, the rack has lateral rails that mate with the sides of the carrier to enable the carrier to slide with respect to the rack. The lateral rails and sides have an opening for allowing air to flow. A fan mounts near the opening, either on the rails or on the sides to cool the hard disk drive. The rail-mounted fans cooperate with the face-mounted fans.

DETAILED DESCRIPTION

Figure 1:
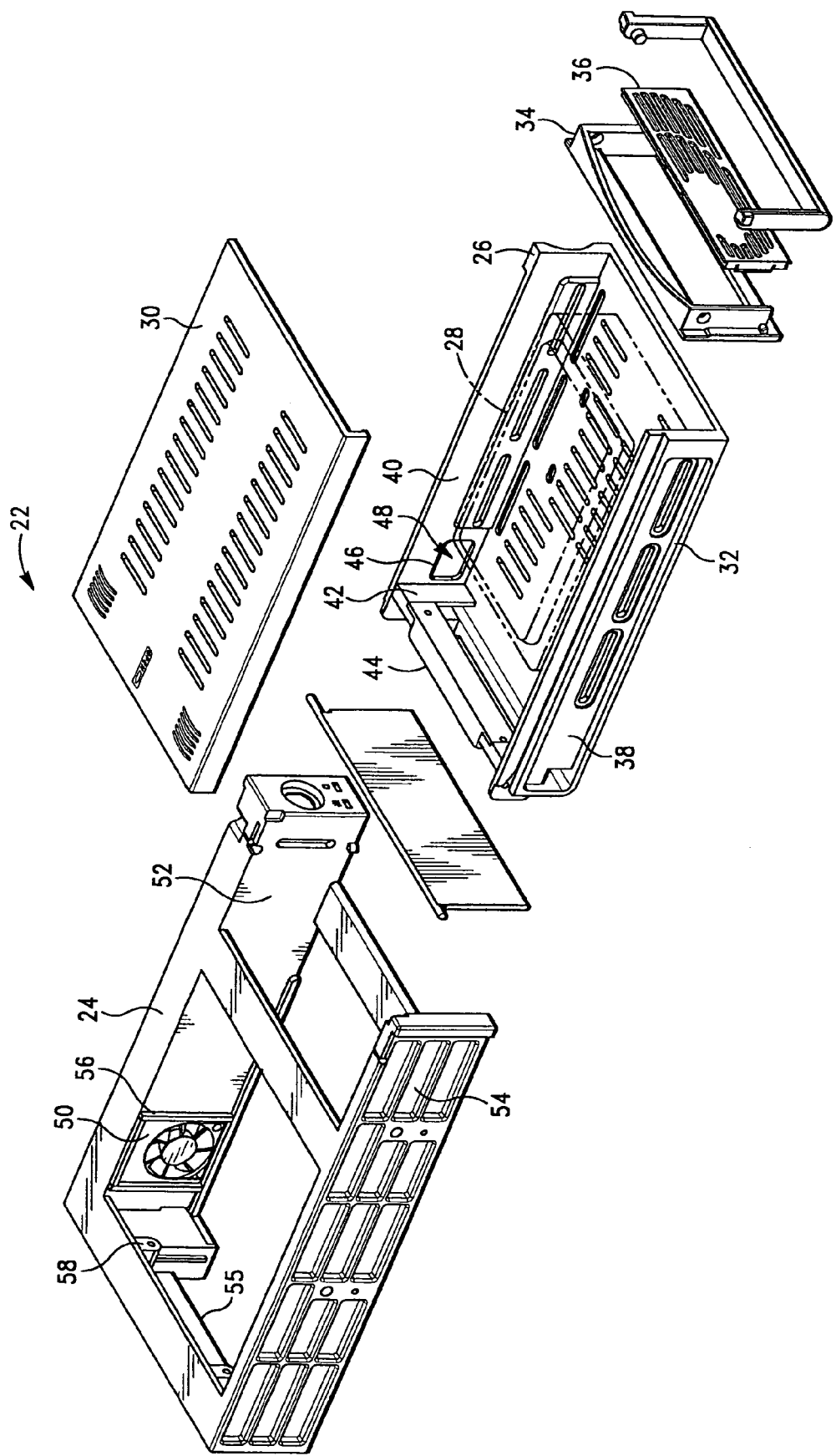
FIG. 1 shows an exploded perspective view of a docking adapter in accordance with the present invention.

FIG. 1 shows a docking adapter for memory storage devices, generally designated with the reference numeral 22. The docking adapter 22 includes a rack 24 and a carrier 26. The carrier 26 holds a hard disk drive 28. It can be appreciated that while the docking adapter 22 is shown removeably docking the hard disk drive 28, the present invention is not limited to use with only hard disk drives. Optical drives can be removeably docked in accordance with the present invention.

The carrier 26 shrouds the hard disk drive 28 to protect the hard disk drive 28 and related components from impact during handling and transport. The carrier 26 has a top cover 30, a tray 32, a face 34 and a vent 36. The carrier 26 includes a first lateral side 38 and a second lateral side 40 that extend perpendicularly from the face, defining portions of the tray 32. The carrier 26 includes a backplane 42 with a data connector 44. The lateral side 40 of the carrier 26 has a periphery 46. The periphery defines an opening 48. The periphery 46 is generally rectangular in shape to enable air to exit the tray 32 of the carrier 26 to cool the hard disk drive 28.

The rack 24 has a fan 50, a first lateral rail 52, a second lateral rail 54 and a backplane 56 with a data connector 58. The data connector 58 couples with the data connector 44 and the opening 48 aligns with the fan 50 when the carrier 26 inserts into the rack 24. Preferably, the lateral sides 38 and 40 of the carrier 26 slidably engage the lateral rails 54 and 52 of the rack 24, respectively, to enable the carrier 26 to slide into the rack 24.

Although a single fan 50 mounted on the first lateral rail 52 is shown, it can be appreciated that additional fans can mount on the rack 24. For example, a fan 50 can mount on the second lateral rail 54 in accordance with the invention to improve cooling of the hard disk drive 28. It can also be appreciated that the carrier may have additional openings to accommodate any additional rack-mounted fans.

The first lateral rail 52 includes a seal 56. The fan 50 has a square periphery with four sides. The seal 56 surrounds the four sides of fan 50, sealing the first lateral rail 52 against the lateral side 40 of the carrier 26 when the carrier 26 inserts into the rack 24. The seal 56 is positioned adjacent the opening 48 to optimize airflow through the opening 48 when the carrier 26 inserts into the rack 24. It can be appreciated that although the seal 56 fully surrounds the fan 50, the seal 56 may alternatively surround only a portion of the fan 50. The seal 56 shape and configuration depend on the configuration of the carrier 26, the top cover 30, the backplane 58 and rail 52 of the rack 24.

It can be appreciated that the seal 56 may be rigid or compliant. According to one aspect of the invention, the seal 56 is compliant, being fabricated from rubber. It can also be appreciated that the seal may attach to the carrier 26 periphery 46, instead of attachment to the rack 24. According to one aspect of the invention, the carrier side 40 and the rack rail 54 fit tightly to seal the fan 50 against the carrier side 40.

The lateral rail 52 is box-shaped to form a conduit 57 through the lateral rail 52. The conduit enables the lateral rail 52 to direct air from the carrier 26 through the distal end of the rack 24, out past the rack backplane 58 in the direction of the arrow 59.

Preferably, the opening 46 is at least ¼ square inches in area to enable the airflow to be sufficient to cool the hard disk drive 28. More preferably, the opening 46 is between ¼ and 1 square inches in area to effectuate hard drive cooling.

Figure 2:
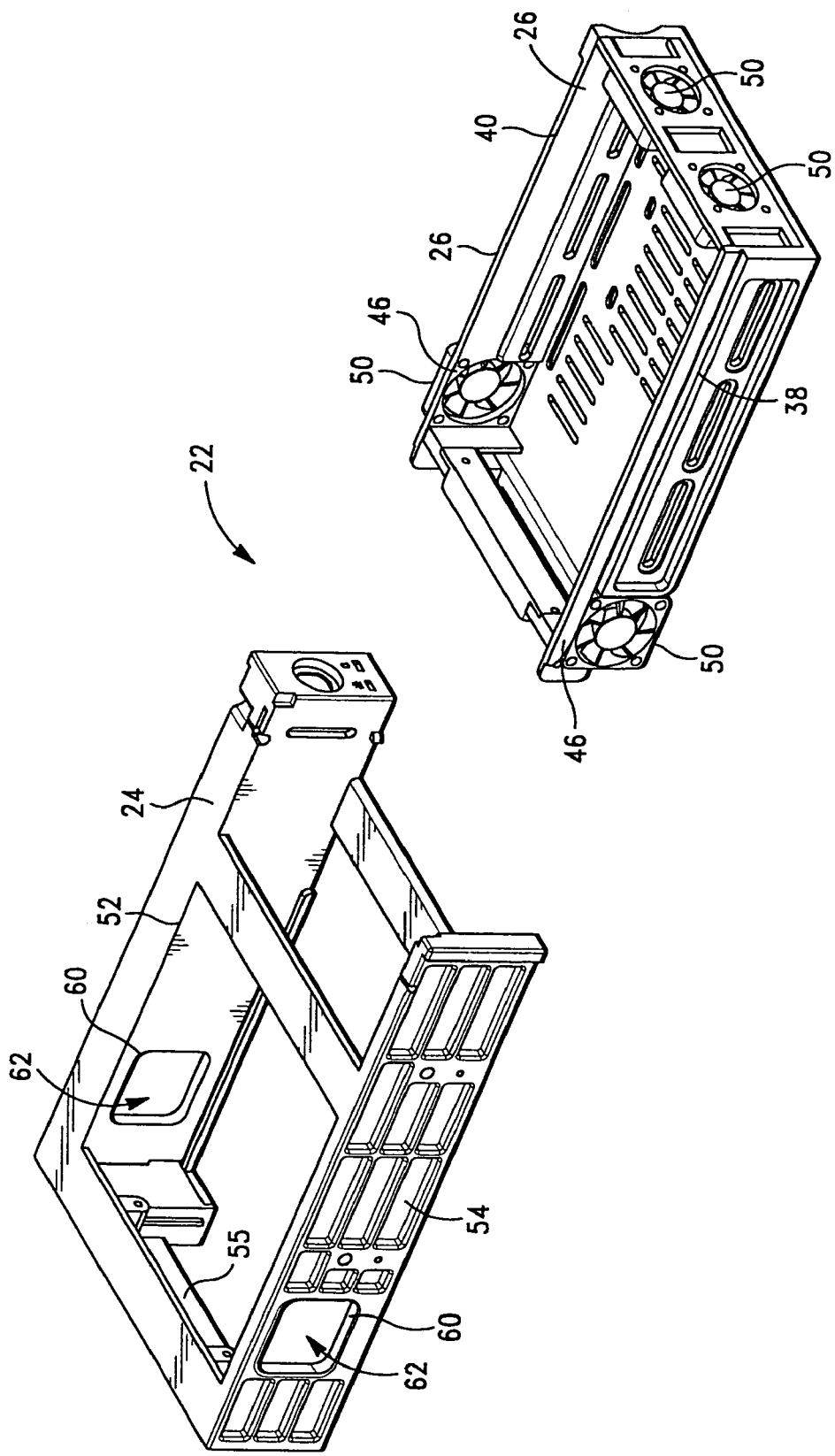
FIG. 2 shows an exploded perspective view of a docking adapter in accordance with the present invention.

FIG. 2 shows the docking adapter 22 where the carrier 26 includes fans 50 mounted on the periphery 46 of the first lateral side 38 and the second lateral side 40 of the carrier 26. The rack 24 has a distal end 55.

The first rail 52 and the second rail 54 of the rack 24 each have a periphery 60 defining an opening 62. When the carrier 26 inserts into the rack 24, the carrier fans 50 of each lateral side 38 and 40 align, respectively, with the rack opening 62 to blow air from the carrier 26 through the rack opening 62. The rack opening 62 on the lateral rail 52 enables air to blow through the conduit 57, exiting exit from the distal end 55 of the rack 24. Preferably, each rack opening 62 is at least ¼ square inches in area to enable sufficient airflow to cool a carrier-mounted memory storage device. More preferably, each opening 62 is between ¼ and 1 square inches in area.

Figure 3:
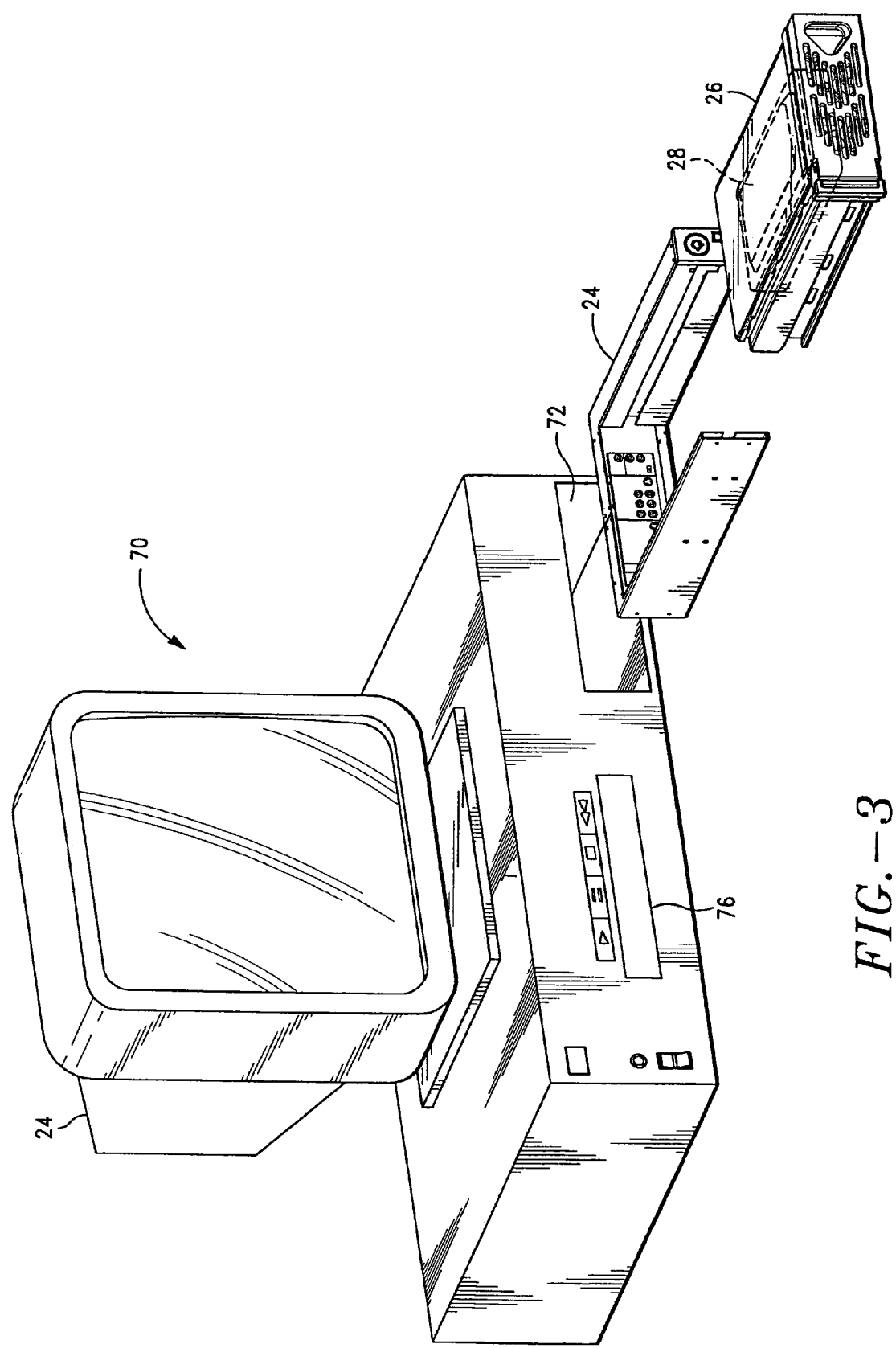
FIG. 3 shows perspective view of a television recorder and docking adapter exploded from the television recorder.

FIG. 3 shows a television recorder generally designated with the reference numeral 70. The television recorder 70 includes a hard drive bay 72. The rack 24 mounts in the bay 72. The carrier 26 holds a hard disk drive 28 and removeably slides into the rack 24 to electronically couple the hard disk drive with the television recorder 70.

The carrier 26 enables removal of the hard disk drive 28. The carrier encases the hard disk drive 28 to protect the hard disk drive 28 from damage during transport and storage. Once the hard disk drive 28 and carrier 26 are removed from the recorder 70, a replacement carrier and hard disk drive can be inserted into the bay 72. This enables archiving television programming, home movies and other video on the removed hard disk drive 28. Providing a removable hard disk drive enables virtually unlimited archiving potential.

The television recorder 70 includes a TV monitor 74. The TV monitor 74 electronically couples to the television recorder 70 to enable users to view television programming.

According to one aspect of the invention, the television recorder 70 includes a tape slot 76 for receiving a VCR tape and enabling the television recorder 70 to archive recorded programming on both VCR tapes and on the hard disk drive 28.

The television recorder 70 includes a MPEG coder and decoder. The recorder 70 captures selected television program broadcast signals, converts the signals into an MPEG stream, decodes the MPEG stream, and selectively provides output to the TV 74. A discussion of an exemplary system for performing these functions is presented in WIPO publication WO 00/07368, published on Feb. 10, 2000, and incorporated herein by reference.

Figure 4:
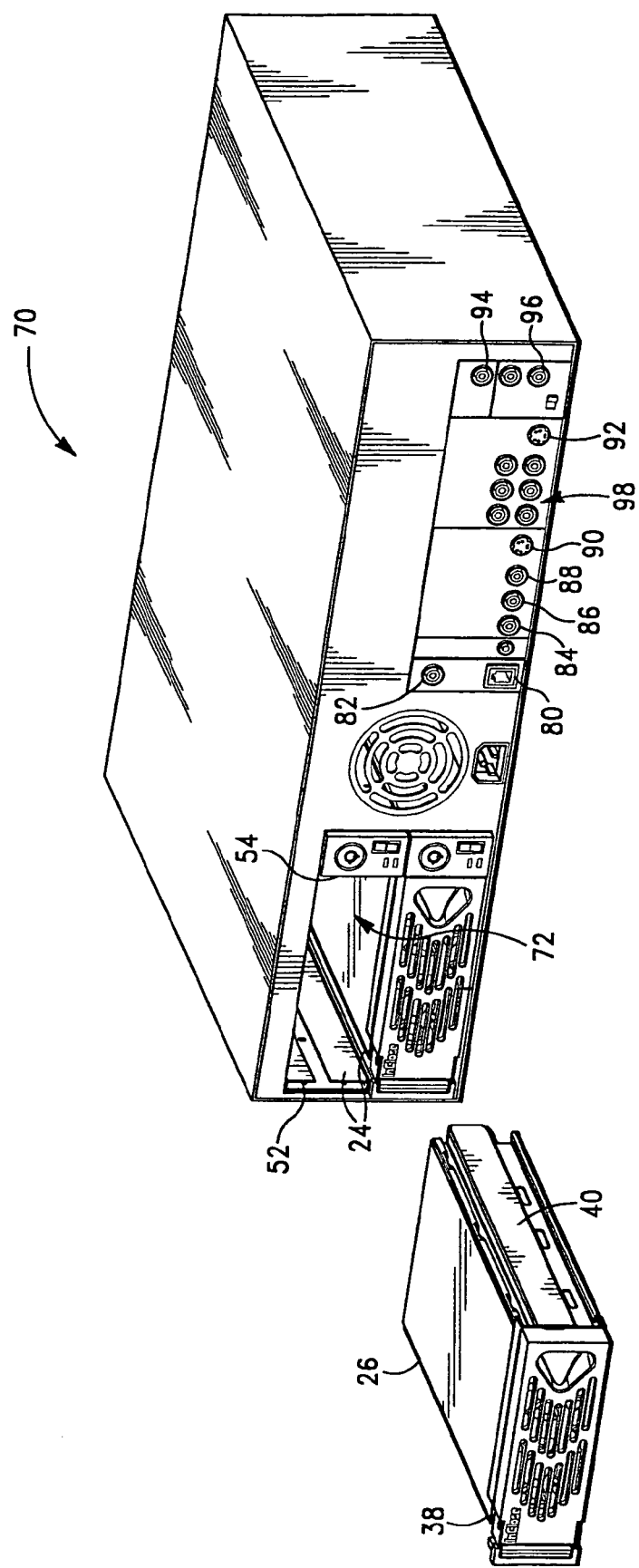
FIG. 4 shows a perspective view of a television recorder having multiple docking adapters.

FIG. 4 shows the television recorder 70. The recorder 70 includes various input and outputs. Preferably, the recorder 70 includes a phone line connector 80, a serial connector 82, audio inputs 84 and 86, a video input 88, an S-video input 90, an s-video output 92, an antenna input 94, RF output 96, and various audio and video outputs generally designated 98. The various outputs 98 enable a television monitor and a VCR, for example, to connect with the recorder 70. The inputs 84 and 86 are connectable to receive broadcast television programming from satellite, cable, video cameras and VCR's, for examples. The input 94 receives broadcast television programming from an antenna source.

The television recorder 70 includes memory storage device bays 72. A rack 24 is integrated into each bay 72. The bays 72 are sized to accept carriers 26 with standard 5¼ inch hard disk drive. The rack 24 includes lateral rails 52 and 54. The lateral sides 38 and 40 of the carrier slidably engage the lateral rails 52 and 54 of the rack 24 to insert the carrier 26 into the television recorder 10 and electronically couple the carrier 26 and the rack 24.

It can be appreciated that the present invention is described in terms of a particular embodiment. It is appreciated that there are many ways to modify the invention described that still are covered by the inventor's concept and the claims below. For example, the configuration of the rack and carrier may be changed. An optical drive, or other memory storage device may be substituted for the hard disk drive of the present invention. The fans may be removed or modified to fit in an alternate location. Accordingly, the present invention is to be limited only by the following claims.

The invention claimed is:

1. A television recorder system having a removeable memory storage device, comprising:
    a television recorder connectable with a television and a television broadcast source for recording television programming, the television recorder having a memory storage bay;
    a rack mounted in the memory storage bay; and
    a carrier for carrying the memory storage device;
    wherein the carrier removeably engages the rack to insert the carrier into the television recorder and to electronically couple the memory storage device with the television recorder, and
    wherein the carrier and the memory storage device are capable of being completely removed from the television recorder.

2. The television recorder system of claim 1 wherein the rack comprises lateral sides and the carrier comprises lateral rails that slidably mate with the lateral sides of the rack when the memory storage device is electronically coupled with the television recorder.

3. The television recorder system of claim 2 wherein at least one lateral rail of the carrier defines an opening, the carrier comprising a fan adapted to flow air through the opening of the carrier to cool the memory storage device.

4. The television recorder system of claim 2 wherein the rack comprises a backplane that attaches to the lateral sides, the backplane comprising a data connector.

5. The television recorder system of claim 1 wherein the carrier comprises a top cover and a tray, the top cover covering the tray to enclose the memory storage device.

6. The television recorder system of claim 5 wherein the top cover comprises vents for allowing air to flow into the carrier and cool the memory storage device.

7. The television recorder system of claim 1 wherein the carrier comprises a face defining a vent to enable air to enter the carrier and a fan mounted on the face to blow air through the vent to cool the memory storage device.

8. The television recorder system of claim 1 wherein the television recorder is a digital video recorder.

9. The television recorder system of claim 1 wherein the memory storage bay is formed at least in part by a housing of the television recorder.

10. The television recorder system of claim 1 wherein the carrier and the memory storage device are removable from a front of the television recorder.

11. A television recorder system having a removeable memory storage device, comprising:
    a television recorder connectable with a television and a television broadcast source for recording television programming, the television recorder having a memory storage bay;
    a rack mounted in the memory storage bay, wherein the rack comprises lateral sides;
    a carrier comprising lateral rails; and
    a memory storage device mounted in the carrier,
    wherein the carrier removeably engages the rack by slidably mating the lateral rails of the carrier with the lateral sides of the rack to insert the carrier into the television recorder and to electronically couple the memory storage device with the television recorder.

12. The television recorder system of claim 11 wherein the carrier and the memory storage device are capable of being completely removed from the television recorder.

13. The television recorder system of claim 11 wherein at least one lateral rail of the carrier defines an opening, the carrier further comprising a fan adapted to flow air through the opening of the carrier to cool the memory storage device.

14. The television recorder system of claim 11 wherein the rack comprises a backplane that attaches to the lateral sides, the backplane comprising a data connector.

15. The television recorder system of claim 11 wherein the carrier comprises a top cover and a tray, the top cover covering the tray to enclose the memory storage device.

16. The television recorder system of claim 15 wherein the top cover comprises vents for allowing air to flow into the carrier and cool the memory storage device.

17. The television recorder system of claim 11 wherein the carrier further comprises a face defining a vent to enable air to enter the carrier and a fan mounted on the face to blow air through the vent to cool the memory storage device.

18. The television recorder system of claim 11 wherein the television recorder is a digital video recorder.

19. The television recorder system of claim 11 wherein the memory storage bay is formed at least in part by a housing of the television recorder.

20. The television recorder system of claim 11 wherein the carrier and the memory storage device are removable from a front of the television recorder.

21. A television recorder system, comprising:
    a housing;
    means for recording television programming;

means for connecting the means for recording with a television and a television broadcast source;
means for carrying the means for recording; and
means for enabling the insertion and complete removal of the means for carrying and the means for recording in the housing.

22. The television recorder system of claim 21 further comprising means for cooling the means for recording television programming.

* * * * *